(12) United States Patent
Hirai et al.

(10) Patent No.: US 6,385,466 B1
(45) Date of Patent: May 7, 2002

(54) PORTABLE TERMINAL DEVICE (75) Inventors: Koutarou Hirai, Kanagawa (JP); Masayuki Yanagida, Atlanta, GA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/232,497

(22) Filed: Jan. 15, 1999

(30) Foreign Application Priority Data

Jan. 19, 1998 (JP) .......................................... 10-020152

(51) Int. Cl.⁷ ................................................ H04Q 7/00
(52) U.S. Cl. ................. 455/566; 455/158.2; 455/159.1; 455/159.2; 340/825.44
(58) Field of Search ................................ 455/566, 344, 455/421, 158.4, 564, 158.5, 159.1, 159.2, 90, 550, 575, 572, 127, 343, 573, 123, 158.2, 38.4, 157.2; 345/156, 155, 150; 374/573, 825.44

(56) References Cited

U.S. PATENT DOCUMENTS

| | | | |
|---|---|---|---|
| 3,899,786 A | | 8/1975 | Greubel et al. |
| 4,975,694 A | * | 12/1990 | McLaughlin et al. .. 340/825.44 |
| 5,465,024 A | * | 11/1995 | Kane .......................... 313/309 |
| 5,517,551 A | * | 5/1996 | Arai ............................ 379/58 |
| 5,793,304 A | * | 8/1998 | Sone ..................... 340/825.44 |
| 5,856,814 A | * | 1/1999 | Yagyu ......................... 345/89 |
| 5,926,239 A | * | 7/1999 | Kumar et al. ................ 349/69 |
| 6,032,024 A | * | 2/2000 | Makino ..................... 455/38.4 |
| 6,046,730 A | * | 4/2000 | Bowen et al. ............... 345/168 |
| 6,055,445 A | * | 4/2000 | Hiroki ........................ 455/566 |
| 6,115,023 A | * | 9/2000 | Uchida ....................... 345/114 |
| 6,115,619 A | * | 9/2000 | Cho ............................ 455/566 |
| 6,131,046 A | * | 10/2000 | Sano et al. .................. 455/566 |

FOREIGN PATENT DOCUMENTS

| | | | | |
|---|---|---|---|---|
| EP | 0 509 727 A2 | | 10/1992 | |
| GB | 2 172 733 A | | 9/1986 | |
| GB | 2242048 | * | 9/1991 | ............ H04B/5/04 |
| GB | WO9633483 | * | 10/1996 | ............ G09G/3/34 |
| JP | 8-82841 | | 3/1996 | |
| JP | 406037715 A | * | 10/1996 | ............ H04B/7/26 |

OTHER PUBLICATIONS

WO 98/06087.

* cited by examiner

*Primary Examiner*—Daniel Hunter
*Assistant Examiner*—Pablo Tran
(74) *Attorney, Agent, or Firm*—Pearne & Gordon LLP (57) ABSTRACT

A portable terminal device including display means 40 for indicating characters and figures, light-emitting means 31 and 32 for emitting exposing light to be used as backlight of the display means, drive means 21 and 22 for activating the light-emitting means, and control means 11 for controlling the drive means, wherein the light-emitting means emits exposed light rays having at least two wavelengths; the control means controls the drive means according to the content of the information to be transmitted to the user in such a way that the wavelength of the exposing light originating from the light-emitting means are changed, thereby enabling the color of backlight of the display means to be changed according to the content of the information to be transmitted. Since a user can ascertain information by means of backlight color, operations required to read characters and figures indicated on the display means can be simplified. This function produces a great effect particularly in darkness.

3 Claims, 7 Drawing Sheets

PORTABLE TERMINAL DEVICE

BACKGROUND OF THE INVENTION

The present invention relates to a portable terminal device having display means such as a liquid crystal display (LCD), and more particularly, to transmission of various types of information items to a user by utilization of backlight colors of display means.

As represented by a portable telephone, recent portable terminal devices have been designed in pursuit of a compact, lightweight, and high-performance portable device. The majority of recent portable telephones employ an LCD module. Further, many of the LCD modules are provided with backlight so that characters or figures indicated on display means can be viewed in darkness, and an LED or EL (electroluminescence) is used as the light source for backlight.

Figure 7:
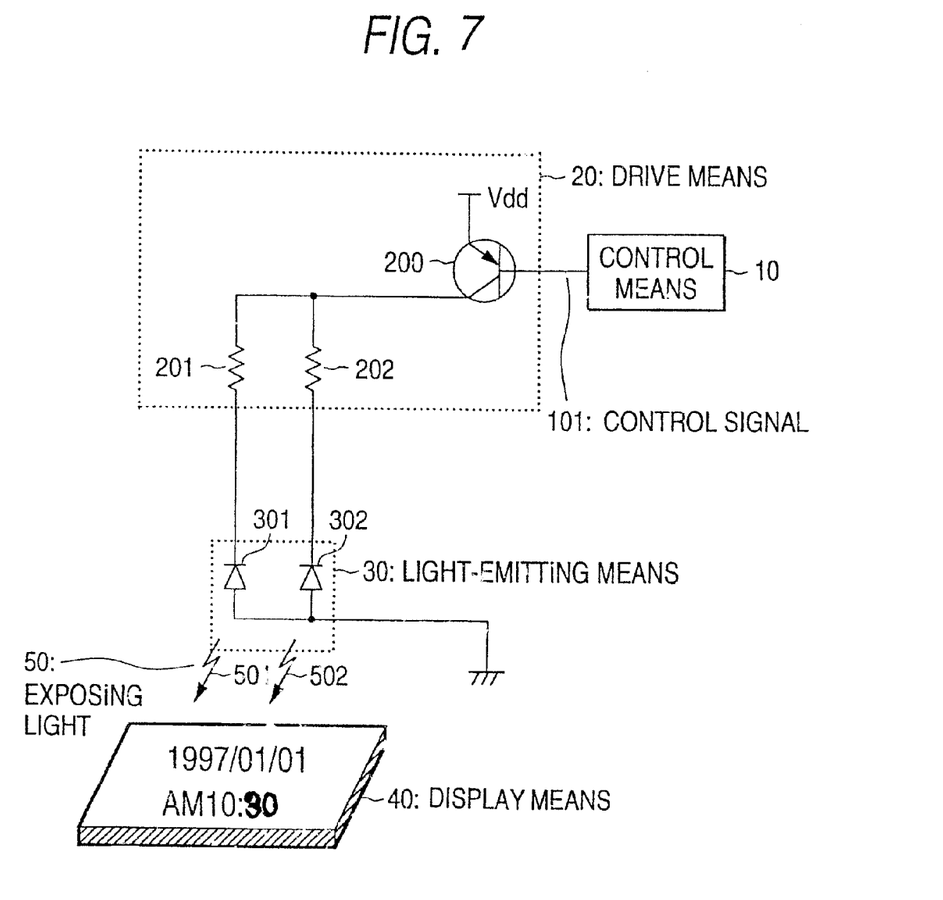
FIG. 7 is a block diagram showing the configuration of a conventional portable terminal device.

As shown in FIG. 7, a conventional portable terminal having a backlight function comprises display means 40 for indicating characters or figures, light-emitting means 30 which serves as the light source for backlight, drive means 20 for actuating the light-emitting means 30, and control means 10 for controlling the drive means 20. The light-emitting means 30 comprises a first light-emitting diode 301 and a second light-emitting diode 302, which emits light of identical wavelength. The drive means 20 comprises a first resistor 201 for limiting an electric current flowing to the first light-emitting diode 301, a second resistor 202 for limiting the electric current flowing to the second light-emitting diode 302, and a transistor 300 which applies a drive voltage and shuts off the supply of drive voltage.

When the user presses any key of the portable terminal device, the control means 10 is activated, and an electric current is supplied to the first light-emitting diode 301 and the second light-emitting diode 302 of the light-emitting means 30. The first light-emitting diode 301 and the second light-emitting diode 302 emit light rays 501 and 502 of the same wavelength. As a result, characters or figures indicated on the display means 40 become sharply visible.

Some portable devices are configured in such a way that the light-emitting means is activated when the control means 10 detects darkness.

However, as the conventional portable terminal device becomes compact and lightweight, the effective area of a display screen of the display means 40 is also reduced, thus limiting the number of characters or the size of figure which can be displayed. As a result, it becomes necessary for the user to perform operations according to complicated procedures in order to obtain required information, or it becomes difficult for the user to see display characters or figures which are reduced in size. These problems make it difficult for children or the aged to use a portable terminal device.

SUMMARY OF THE INVENTION

The present invention has been conceived to solve the problems in the conventional portable terminal device, and the object of the present invention is to provide a portable terminal device capable of instantaneously transmitting various information items to the user by utilization of backlight of the display means.

A portable terminal device according to the present invention is capable of changing the color of backlight of the display means according to the contents of information to be transmitted.

To this end, the user can instantaneously ascertain information by means of the color of backlight of the display means without reading characters or figures indicated on the display means. Accordingly, information becomes easily understandable even for children and the aged, thereby enabling correct understanding of information even in darkness.

According to a first aspect of the present invention, there is provided a portable terminal device having backlight display means, wherein the color of backlight of the display means can be changed according to the content of information to be transmitted, thereby enabling a user to instantaneously understand the information from the backlight color.

According to a second aspect of the present invention, there is provided a portable terminal device including display means for indicating characters and figures, light-emitting means for emitting exposing light to be used as backlight of the display means, drive means for activating the light-emitting means, and control means for controlling the drive means, wherein the light-emitting means emits exposed light rays having at least two wavelengths;

the control means controls the drive means according to the content of the information to be transmitted to the user in such a way that the wavelength of the exposing light originating from the light-emitting means is changed, thereby enabling the color of backlight of the display means to be changed according to the content of the information to be transmitted.

According to a third aspect of the present invention, the light-emitting means has at least two light-emitting elements which emit light rays of different wavelengths, and the control means controls the drive means to thereby switch on or off a single light-emitting element which emits light of a single wavelength or to thereby cause a plurality of light-emitting elements to simultaneously emit a plurality of light rays of different wavelengths. More specifically, the control means switches on or off a light-emitting element which emits light having a single color or causes a plurality of light-emitting elements to simultaneously emit light, thereby giving out a mixed light ray. As a result, the color of backlight is changed.

According to a fourth aspect of the present invention, the portable terminal device further comprises detection means for detecting the voltage level of a drive battery of the portable terminal device and setting means for setting a threshold value for the voltage level of the battery. When the voltage level detected by the detection means reaches the threshold value, the control means controls the drive means, thereby switching the wavelength of the light originating from the light-emitting means. The user can instantaneously ascertain a drop in the voltage level of the drive battery from the change of backlight color of the display means from ordinary color.

According to a fifth aspect of the present invention, the portable terminal device further comprises reading means for reading from a received signal a signal for specifying the color of backlight of the display means. On the basis of the signal which is read by the reading means and specifies backlight color, the control means controls the drive means, thereby changing the wavelength of the light originating from the light-emitting means. If a calling party using another portable terminal device originates a call while specifying backlight color, the backlight of the display means of the portable terminal device of the called party assumes the specified color. Therefore, if the user makes a prior arrangement with supposed calling parties regarding designation of backlight color, from the backlight color the called party can realize an incoming call is from a specific calling party.

According to a sixth aspect of the present invention, the portable terminal device further comprises reading means for reading from a received signal the phone number of the calling party;

storage means for storing at least one phone number; and comparison means for comparing the phone number of the calling party read by the reading means with the phone numbers stored in the storage means. On the basis of the result of the comparison performed by the comparison means, the control means controls the drive means, thereby switching the wavelength of the light originating from the light-emitting means. Upon receipt of an incoming call from the calling party registered in the storage means, the called party can identify the calling party from the color of backlight of the display means.

According to a seventh aspect of the present invention, the portable terminal device further comprises measurement means for measuring the electric field level of a received signal; and setting means for setting a threshold value for the electric field.

When the electric field level measured by the measurement means reaches the threshold value, the control means controls the drive means, thereby switching the wavelength of the light originating from the light-emitting means. From the color of the backlight of the display means, the user of the portable terminal device becomes aware that he is outside of a normally-receivable range.

DETAILED DESCRIPTION OF THE PREFERRED EMBODIMENTS

Preferred embodiments of the present invention will now be described by reference to FIGS. 1 through 6.

First Embodiment

A portable terminal device according to a first embodiment transmits information by means of the color of backlight of the display means.

Figure 1:
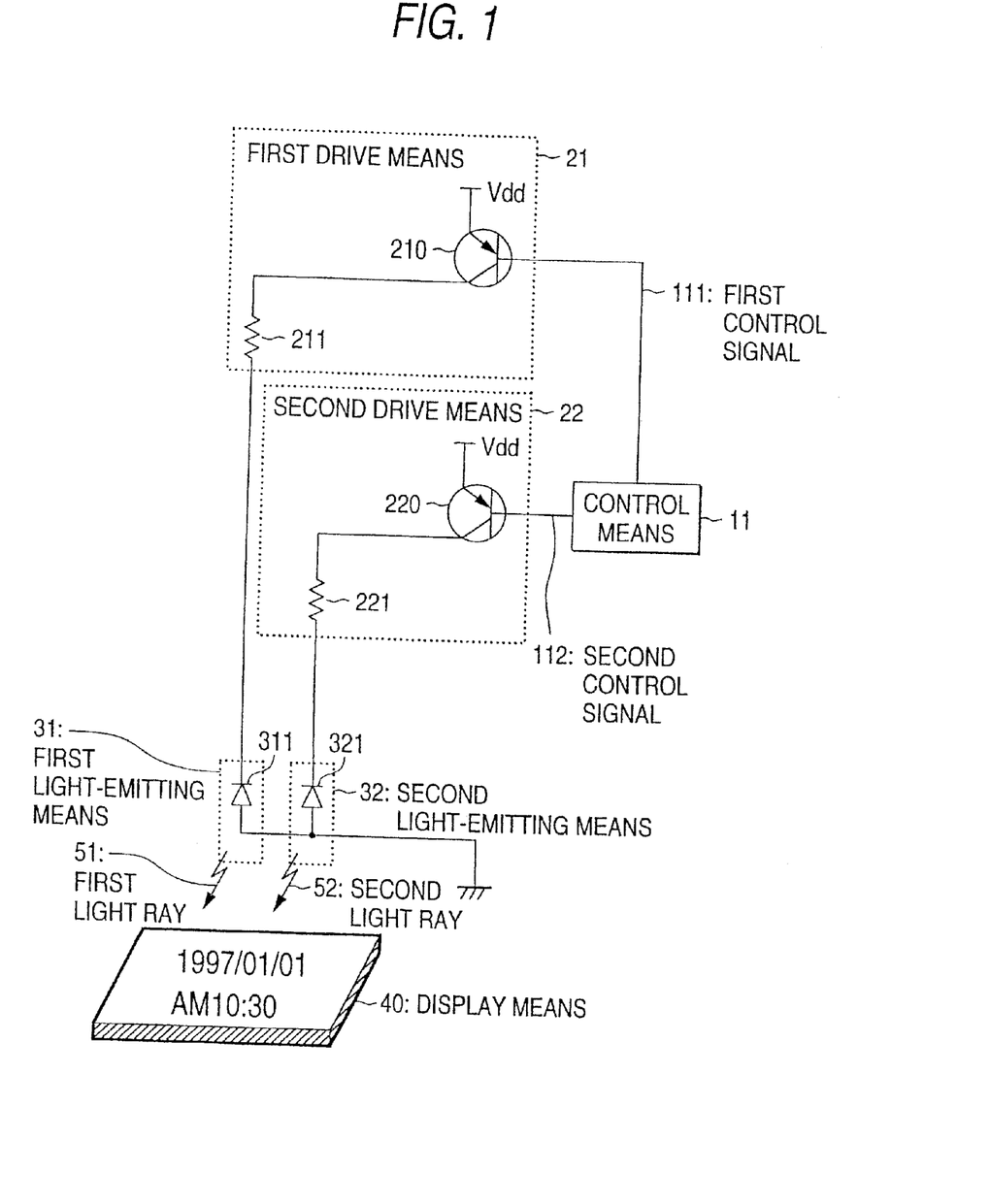
FIG. 1 is a block diagram showing the configuration of a portable terminal device according to a first embodiment of the present invention.

As shown in FIG. 1, the terminal device comprises display means 40 for indicating characters and figures; first light-emitting means 31 for emitting a light ray 51 of a first wavelength as the backlight of the display means 40; second light-emitting means 32 for emitting a light ray 52 of a second wavelength as the backlight of the display means 40; first drive means 21 for driving the first light-emitting means 31; second drive means 22 for driving the second light-emitting means 32; and control means 11 for controlling the first drive means 21 and the second drive means 22.

The first light-emitting means 31 comprises a light-emitting diode 311 for emitting the light ray 51 of the first wavelength, and the second light-emitting means 32 comprises a light-emitting diode 312 for emitting the light ray 52 of the second wavelength. The first drive means 21 comprises a first resistor 211 for limiting an electric current flowing to the light-emitting diode 311 and a first transistor 210 for applying a drive voltage or shutting off the supply of drive voltage. The second drive means 22 comprises a second resistor 221 for limiting an electric current flowing to the light-emitting diode 312 and a second transistor 220 for applying a drive voltage or shutting off the supply of drive voltage.

The operation of the portable terminal device will now be described.

When the portable terminal device is in a first operation state, the control means 11 activate a first control signal 111. As a result, the transistor 210 of the first drive means 21 is turned on, and a voltage is applied to the light-emitting diode 311. The light-emitting diode 311 emits the light ray 51 having the first wavelength.

When the portable terminal device is in a second operation state, the control means 11 activates a second control signal 112. As a result, the transistor 220 of the second drive means 22 is turned on, and a voltage is applied to the light-emitting diode 321. The light-emitting diode 321 emits the light ray 52 having the second wavelength.

When the portable terminal device is in the first operation state., the backlight of the display means 40 assumes light having the first wavelength. When the portable terminal device is in the second operation state, the backlight of the display means 40 assumes light having the second wavelength. Accordingly, the user can instantaneously ascertain the operation status of the portable terminal device from the color of backlight of the display means 40.

Thus, the user of the portable terminal device according to the first embodiment can ascertain the operation status of the portable terminal device from only the color of backlight of the display means 40 without reading characters and figures indicated on the display means 40. This function produces a great effect, particularly in darkness.

Second Embodiment

A portable terminal device according to a second embodiment of the present invention reports to the user whether or not the voltage level of the battery can still ensure normal operation, by means of backlight color of the display means.

Figure 2:
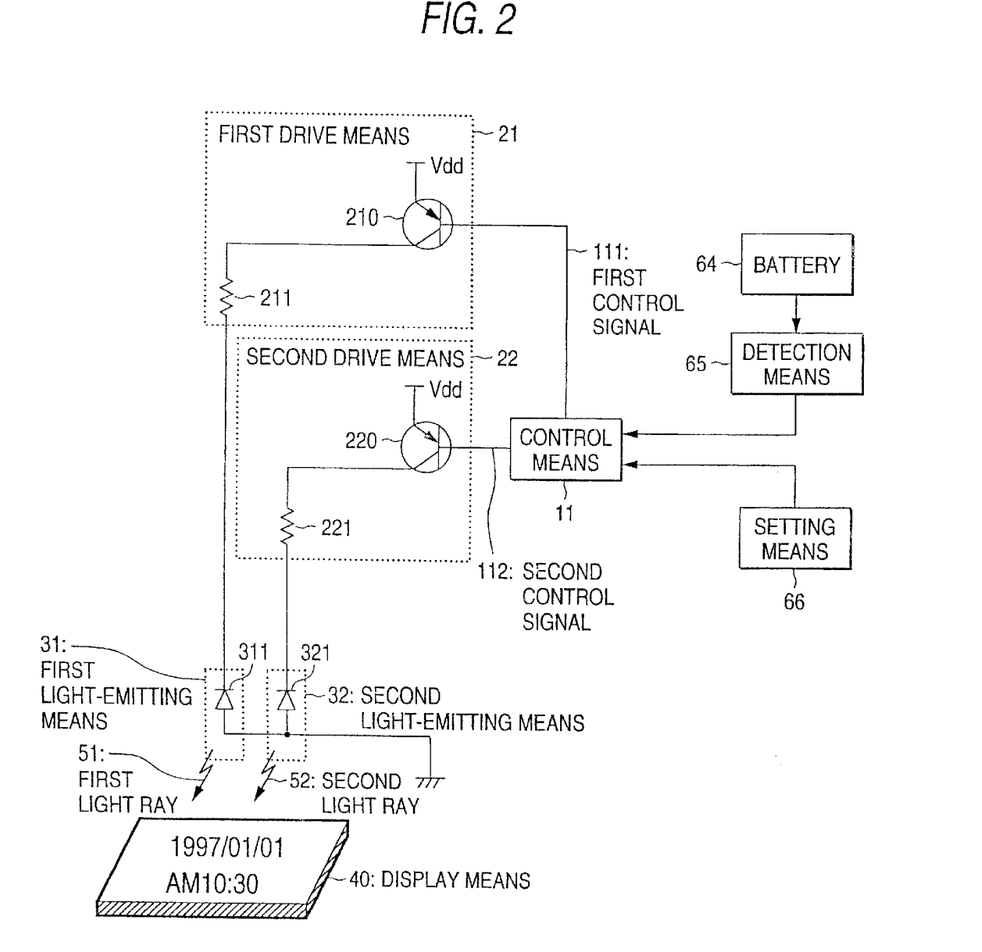
FIG. 2 is a block diagram showing the configuration of a portable terminal device according to a second embodiment of the present invention.

As shown in FIG. 2, the portable terminal device comprises detection means 65 for detecting the voltage level of a drive battery 64 of the portable terminal device; setting means 66 for setting the reference voltage level; and control means 11 for controlling the first drive means 21 and the second drive means 22 on the basis of the result of comparison between the detected voltage level of the battery 64 and the reference voltage level. In other respects, the portable terminal according to the present embodiment is identical in configuration to that according to the first embodiment (shown in FIG. 1).

The operation of the portable terminal device will now be described.

The voltage level of the battery 64 at which normal operation of the portable terminal device is ensured is taken as a first voltage level, and the voltage level of the same at which normal operation of the portable terminal device cannot be ensured is taken as a second voltage level. The setting means 66 sets a first threshold value for transition from the first voltage level to the second voltage level and a second threshold value for transition from the second voltage level to the first voltage level.

When the portable terminal device is in use, the control means 11 compares the voltage level of the battery 64 detected by the detection means 65 with the first threshold value set by the setting means 66. If the voltage level of the battery 64 exceeds the first threshold value, the control means 11 activates the first control signal 111. At this time, as previously mentioned in connection with the first embodiment, the light-emitting diode 311 emits the light ray 51 having the first wavelength.

When the voltage level of the battery 64 is lower than the first threshold value, the control means 11 activates the second control signal 112. As previously described in connection with the first embodiment, the light-emitting diode 321 emits the light ray 52 having the second wavelength.

Accordingly, the user of the portable terminal device can ascertain, from a-change in backlight color, that the voltage level of the battery 64 has dropped to the level at which the portable terminal device cannot ensure normal operation.

When the battery 64 of the portable terminal device is recharged, the control means 11 compares the voltage level of the battery 64 detected by the detection means 65 with the second threshold value set by the setting means 66. If the voltage level of the battery 64 is lower than the second threshold value, the control means 11 activates the second control signal 112. In contrast, if the voltage level of the battery 64 is higher than the threshold value, the control means 11 activates the first control signal Therefore, the user can ascertain from a change in backlight color that the battery 64 has been recharged to a normal voltage level.

As mentioned above, the user of the portable terminal device according to the second embodiment can ascertain the condition of the battery 64 from only the color of backlight of the display means 40 without reading characters and figures indicated on the display means 40. This function produces a great effect, particularly in darkness.

Third Embodiment

A portable terminal device according to a third embodiment enables the calling party to specify the color of backlight of the display means of the portable terminal of the called party.

Figure 3:
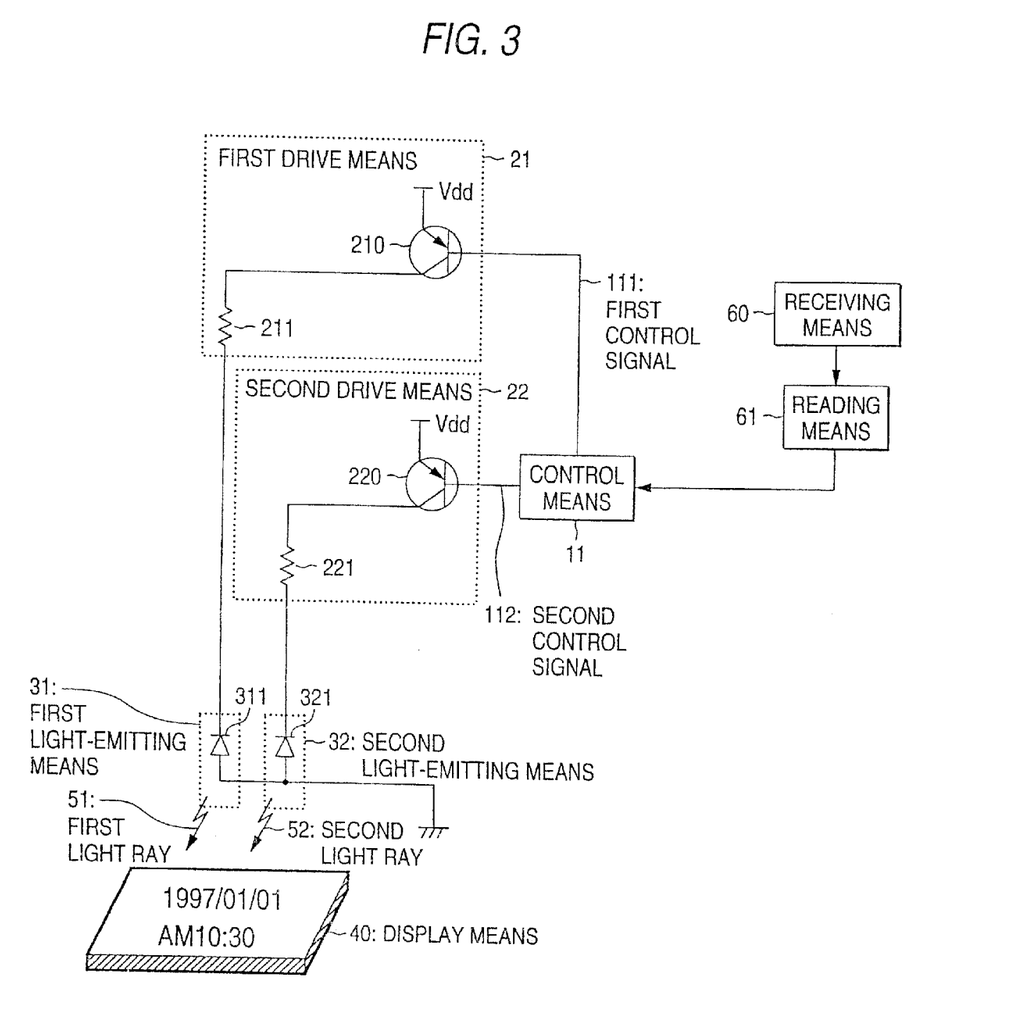
FIG. 3 is a block diagram showing the configuration of a portable terminal device according to a third embodiment of the present invention.

As shown in FIG. 3, the portable terminal device comprises receiving means 60 for receiving a signal waveform transmitted from another portable terminal device; reading means 61 for reading, from the received signal, a signal for specifying the color of backlight of the display means 40; and the control means 11 for controlling the first drive means 21 or the second drive means 22 on the basis of the result of the reading operation performed by the reading means 61. In other respects, the portable terminal device according to the third embodiment is identical in configuration with that according to the first embodiment (shown in FIG. 1).

The operation of the portable terminal device will now be described.

When the calling party of another portable terminal device originates a call while specifying a first color designation signal, the reading means 61 reads the first color designation signal from the signal received by the receiving means 60 and sends the thus-read signal to the control means 11. Upon receipt of the first color designation signal, the control means 11 activates the first control signal 111. At this time, as previously described in connection with the first embodiment, the light-emitting diode 311 emits the light ray 51 having the first wavelength.

When the calling party of another portable terminal device originates a call while specifying a second color designation signal, the reading means 61 reads the second color designation signal from the signal received by the receiving means 60 and sends the thus-read signal to the control means 11. Upon receipt of the second color designation signal, the control means 11 activates the second control signal 112. At this time, as previously described in connection with the first embodiment, the light-emitting diode 312 emits the light ray 52 having the, second wavelength.

As mentioned above, the portable terminal device according to the third embodiment enables the calling party to specify the color of backlight of the display device 40 which indicates an incoming call. Accordingly, if the user makes a prior arrangement with conceivable calling parties regarding the rule of designation of backlight color, the user of the portable terminal device can identify the calling party of the incoming call.

Fourth Embodiment

A portable terminal device according to a fourth embodiment of the present invention can indicate an incoming call from a specific calling party through use of the color of backlight of the display means.

Figure 4:
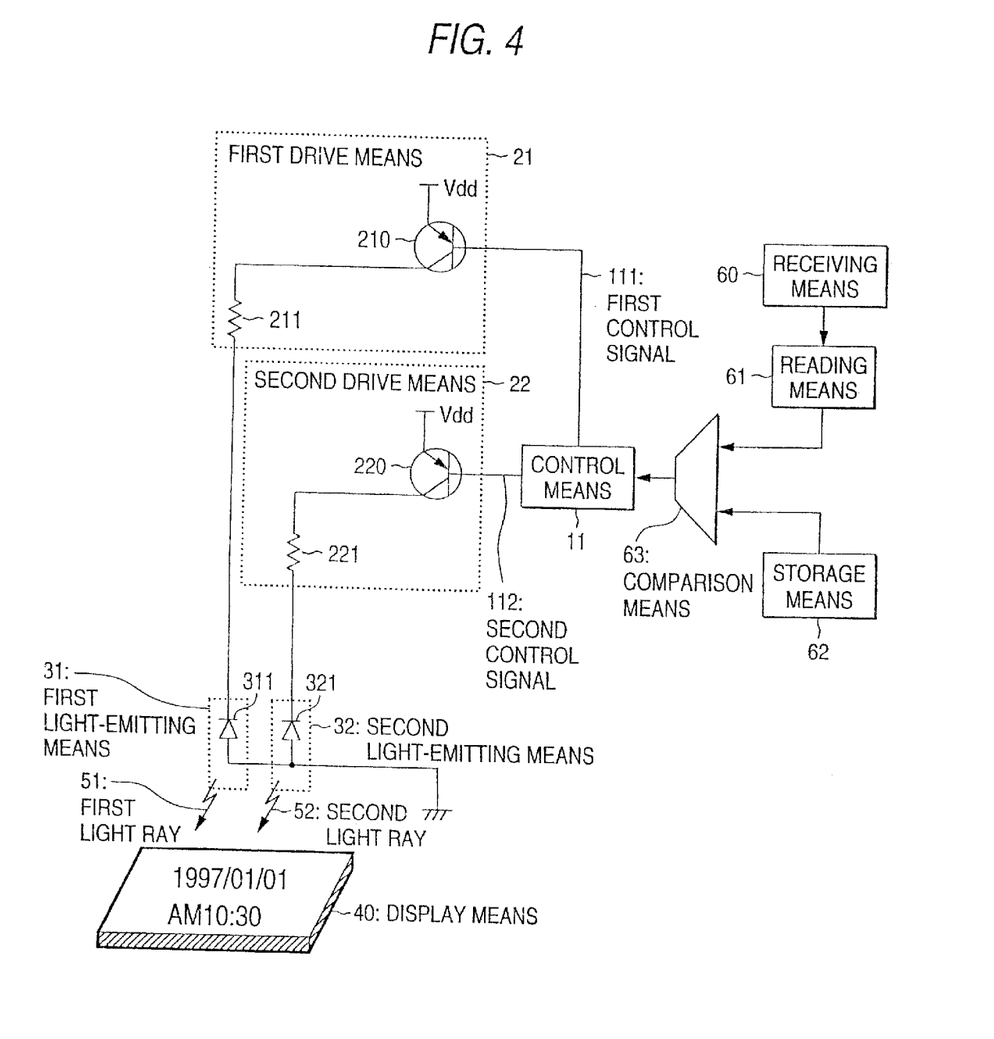
FIG. 4 is a block diagram showing the configuration of a portable terminal device according to a fourth embodiment of the present invention.

As shown in FIG. 4, the terminal device comprises receiving means 60 for receiving a signal waveform transmitted from another portable terminal device; reading means 61 for reading the phone number of the calling party from the received signal; comparison means 63 for comparing the phone number of the calling party read by the reading means 61 with the phone numbers stored in the storage means 62; and the control means 11 for driving the first drive means 21 or the second drive means 22 on the basis of result of the comparison performed by the comparison means 63. In other respects, the portable terminal device according to the fourth embodiment is identical in configuration with that according to the first embodiment (shown in FIG. 1)

The operation of the portable terminal device will now be described.

The reading means 61 reads the phone number of the calling party from the incoming signal received by the receiving means 60 and outputs the thus-read phone number to the comparison means 63. The comparison means 63 compares the phone number of the calling party with the phone numbers registered in the storage means 62 and outputs the result of such comparison to the control means 11.

When the comparison means 63 detects a match between the compared phone numbers, the control means 11 activates the first control signal 111. At this time, as previously described in connection with the first embodiment, the light-emitting diode 311 emits the light ray 51 having the first wavelength. In contrast, when the comparison means 63 detects a discrepancy between the compared phone numbers, the control means 11 activates the second control signal 112. At this time, as previously described in connection with the first embodiment, the light-emitting diode 321 emits the light ray 52 having the second wavelength.

Accordingly, when the portable terminal device receives an incoming call from a calling party whose phone number is registered in the storage means 62, the backlight of the display means 40 assumes the color of the first wavelength. If the portable terminal device receives an incoming call from a calling party who is not registered, the backlight of the display means 40 assumes the color of the second wavelength. Therefore, the user of the portable terminal device can identify the calling party of the incoming call.

As mentioned previously, the user of the portable terminal device according to the fourth embodiment can identify an incoming call from a specific calling party from only the color of backlight of the display means 40 without reading characters and figures indicated on the display means 40. This function can produce a great effect, particularly in darkness.

Fifth Embodiment

A portable terminal device according to a fifth embodiment indicates whether or not the receiving electric field level reaches a level at which the portable terminal device can operate normally, by means of backlight color of the display means.

Figure 5:
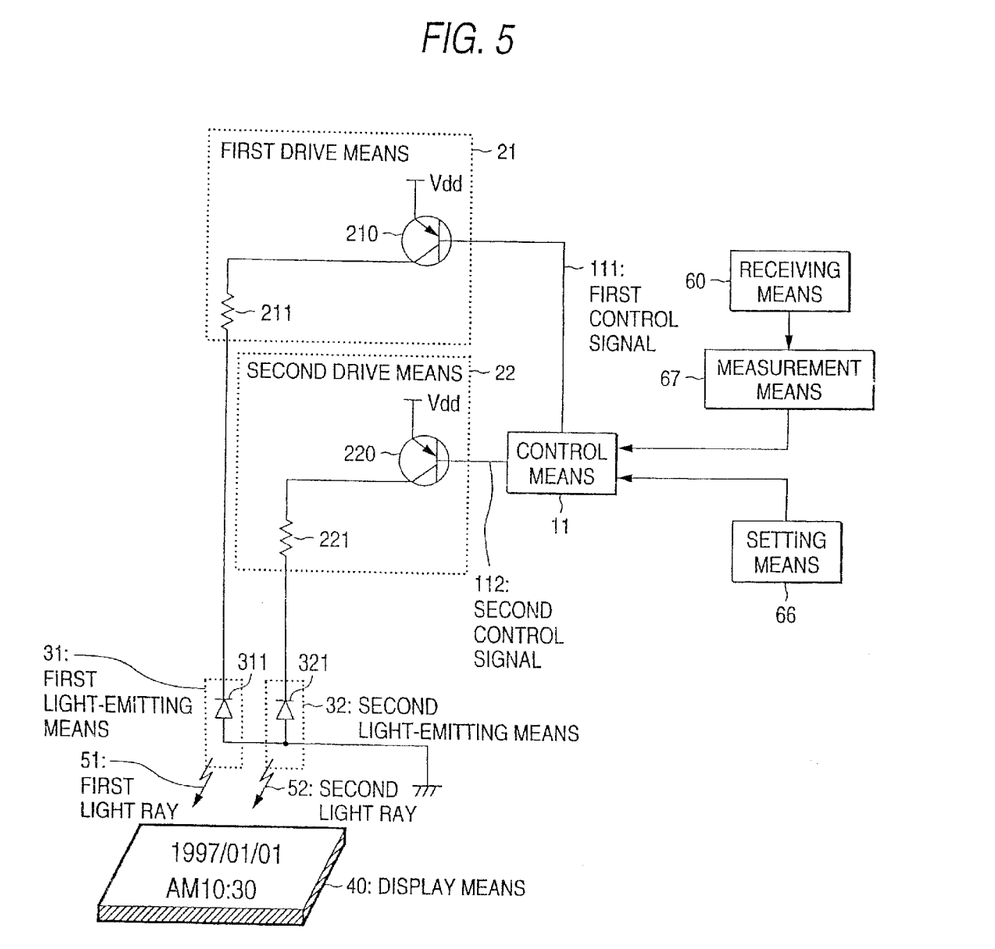
FIG. 5 is a block diagram showing the configuration of a portable terminal device according to a fifth embodiment of the present invention.

As shown in FIG. 5 the portable terminal device comprises receiving means 60 for receiving a signal waveform transmitted from another portable terminal device; measurement means 67 for measuring the electric field level of the signal received by the receiving means 60; setting means 68 for setting a reference electric field level; and the control means 11 for activating the first drive means 21 and the second drive means 22 on the basis of the result of comparison between the thus-measured electric field level and the reference electric field level. In other respects, the portable terminal device according to the fourth embodiment is identical in configuration with that according to the first embodiment (shown in FIG. 1).

The operation of the portable terminal device will now be described.

A receiving level at which the portable terminal device can perform a normal receiving operation is taken as a first electric field level, and a receiving level at which the portable terminal device cannot perform a normal receiving operation is taken as a second electric field level (or an out-of-range level). The setting means 66 sets a first threshold value for transition from the first electric field level to the second electric field level and a second threshold value for transition from the second electric field level to the first electric field level.

When the portable terminal device is in use, the control means 11 compares the receiving electric field level measured by the measurement means 67 with the first threshold value set by the setting means 66. If the receiving electric field level exceeds the first threshold value, the control means 11 activates the first control signal 111. At this time, as previously mentioned in connection with the first embodiment, the light-emitting diode 311 emits the light ray 51 having the first wavelength. Further, if the receiving electric field level becomes lower than the first threshold value from this state, the control means 11 activates the second control signal 112. At this time, as previously mentioned in connection with the first embodiment, the light-emitting diode 312 emits the light ray having the second wavelength.

When the receiving electric field is lower than the second threshold value, the control means 11 compares the receiving electric field level measured by the measurement means 67 with the second threshold value set by the setting means 66. If the receiving electric field level exceeds the second threshold value, the control means 11 activates the first control signal 111, thereby causing the light-emitting diode 311 to emit the light ray 51 having the first wavelength.

Accordingly, when n the backlight color assumes the color of the first wavelength, the user becomes aware that the receiving electric field is sufficient for ensuring normal operations of the terminal device. When the backlight color assumes the color of the second wavelength, the user becomes aware that the receiving electric field is insufficient for ensuring normal operations of the terminal device.

Thus, the user of the portable terminal device according to the fifth embodiment instantaneously becomes aware of a change in the receiving electric field level from only the color of backlight of the display means 40 without reading characters and figures indicated on the display means 40. This function can produce a great effect, particularly in darkness.

The previous embodiments describe that the color of backlight of the display means 40 is switched by illuminating solely the first light-emitting means 31 or the second light-emitting means 32. However, the backlight may be switched to a mixed light ray consisting of the light ray from the first light-emitting means 31 and the light ray from the second light-emitting means 32, by simultaneously illuminating the first and second light-emitting means 31 and 32. In this case, the backlight color can be switched between three colors through use of two light-emitting means.

The number of light-emitting means may be changed to a value of three or-more.

Figure 6:
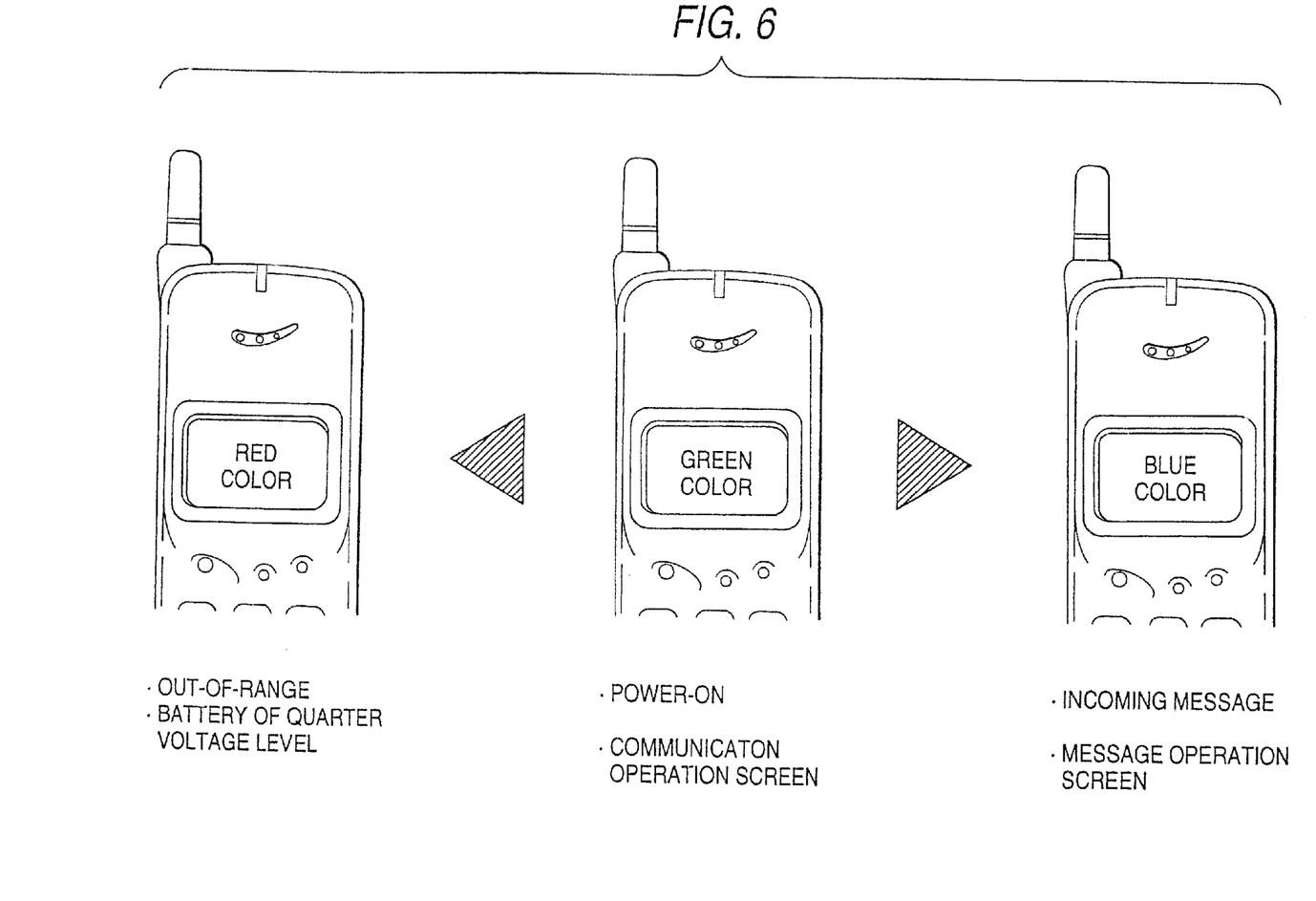
FIG. 6 is an illustration showing specific operations of the portable terminal device according to the present invention.

FIG. 6 shows a specific example in which the color of backlight of the display means is switched between three colors. When the portable terminal device is in the receivable range, the backlight assumes a green color at power-on. However, when the portable terminal device is outside of the receivable range, the backlight assumes a red color. Further, even when the voltage level of the battery is reduced to one-quarter of the maximum voltage level, the backlight assumes a red color. When the portable terminal device receives an incoming call from a specific calling party, the backlight assumes a blue color.

As mentioned above, the user of the portable terminal device according to the present invention becomes aware of various conditions of the portable terminal device from only a change in the backlight color.

As has been mentioned above, the portable terminal device according to the present invention enables instantaneous transmission of the operating status of the portable terminal device to the user. Therefore, the user can simplify operations required for reading characters and figures indicated on the display means, thereby rendering the operations of the portable terminal device easy for children and the aged.

Further, the user can correctly ascertain information even in darkness.

What is claimed is:

1. A portable terminal device comprising:

display means for indicating characters and figures;

light-emitting means for emitting exposing light to be used as backlight of said display means;

drive means for activating said light-emitting means; and control means for controlling said drive means, wherein said light-emitting means emits exposed light rays having at least two wavelengths, said control means controls said drive means according to the content of the information to be transmitted to a user so as to change the wavelength of the exposing light originating from said light-emitting means;

detection means for detecting the voltage level of a drive battery of said portable terminal device; and setting means for setting a threshold value for the voltage level of said battery, wherein when the voltage level detected by said detection means reaches the threshold value, said control means controls said drive means so as to switch the wavelength of the light originating from said light-emitting means.

2. A portable terminal device comprising:

display means for indicating characters and figures;

light-emitting means for emitting exposing light to be used as backlight of said display means;

drive means for activating said light-emitting means; and control means for controlling said drive means, wherein said light-emitting means emits exposed light rays having at least two wavelengths, and said control means controls said drive means according to the content of the information to be transmitted to a user so as to change the wavelength of the exposing light originating from said light-emitting means, reading means for reading from a received signal the phone number of the calling party;

storage means for storing at least one phone number; and comparison means for comparing the phone number of the calling party read by said reading means with the phone numbers stored in said storage means, wherein on the basis of the result of the comparison performed by said comparison means, said control means controls said drive means so as to switch the wavelength of the light originating from said light-emitting means.

3. A portable terminal device comprising:

display means for indicating characters and figures;

light-emitting means for emitting exposing light to be used as backlight of said display means;

drive means for activating said light-emitting means; and control means for controlling said drive means, wherein said light-emitting means emits exposed light rays having at least two different wavelengths, said control means controls said drive means according to the content of the information to be transmitted to a user so as to change the wavelength of the exposing light originating from said light-emitting means;

measurement means for measuring the electric field level of a received signal; and setting means for setting a threshold value for the electric field, wherein when the electric filed level measured by said measurement means reaches the threshold value, said control means controls said drive means so as to switch the wavelength of the light originating from said light-emitting means.

* * * * *

UNITED STATES PATENT AND TRADEMARK OFFICE
CERTIFICATE OF CORRECTION

PATENT NO. : 6,385,466 B1
DATED : May 7, 2002
INVENTOR(S) : Koutarou Hirai and Masayuki Yanagida It is certified that error appears in the above-identified patent and that said Letters Patent is hereby corrected as shown below:

<u>Column 4,</u>
Line 36, after "state", please insert therefor -- . -- (period).

<u>Column 5,</u>
Line 25, please delete "a-change", and insert therefor -- a change --.
Line 36, after "signal", please insert therefor -- 11. --

<u>Column 6,</u>
Line 18, after the second occurrence of "the", please delete "," (comma).

<u>Column 8,</u>
Line 6, after "when", please delete "n" therefor.

<u>Column 10,</u>
Line 26, please delete "filed", and insert therefor -- field --.

Signed and Sealed this

Fifteenth Day of October, 2002

*Attest:*

JAMES E. ROGAN
*Attesting Officer*   *Director of the United States Patent and Trademark Office*